United States Patent
Gu et al.

(10) Patent No.: US 8,385,654 B2
(45) Date of Patent: Feb. 26, 2013

(54) SALIENCE ESTIMATION FOR OBJECT-BASED VISUAL ATTENTION MODEL

(75) Inventors: Xiao Dong Gu, Beijing (CN); Zhi Bo Chen, Beijing (CN); Qu Qing Chen, Beijing (CN)

(73) Assignee: Thomson Licensing, Boulogne-Billancourt (FR)

( * ) Notice: Subject to any disclaimer, the term of this patent is extended or adjusted under 35 U.S.C. 154(b) by 1141 days.

(21) Appl. No.: 12/226,386

(22) PCT Filed: Apr. 27, 2007

(86) PCT No.: PCT/EP2007/054195
§ 371 (c)(1),
(2), (4) Date: Oct. 17, 2008

(87) PCT Pub. No.: WO2007/125115
PCT Pub. Date: Nov. 8, 2007

(65) Prior Publication Data
US 2009/0060267 A1    Mar. 5, 2009

(30) Foreign Application Priority Data

Apr. 28, 2006  (EP) .................................... 06300418
May 31, 2006  (EP) .................................... 06300538

(51) Int. Cl.
*G06K 9/46*    (2006.01)
*G06K 9/34*    (2006.01)
*G06K 9/00*    (2006.01)

(52) U.S. Cl. ......................... 382/190; 382/173; 382/103

(58) Field of Classification Search .................. 382/190, 382/173, 103
See application file for complete search history.

(56) References Cited

U.S. PATENT DOCUMENTS

| 6,282,317 | B1 * | 8/2001 | Luo et al. ....................... 382/203 |
| 7,940,985 | B2 * | 5/2011 | Sun et al. ....................... 382/173 |
| 2005/0084136 | A1 * | 4/2005 | Xie et al. ....................... 382/107 |

FOREIGN PATENT DOCUMENTS

EP    1017019    7/2000

OTHER PUBLICATIONS

J. Luo et al: "On measuring low-level self and relative saliency in photographic images" Pattern Recognition Letters, vol. 22, No. 2, Feb. 2001, pp. 157-169, XP004315118.
L. Itti et al.: "A Saliency-Based Search Mechanism for Overt and Covert Shifts of Visual Attention", Vision Research, vol. 40, No. 10-12, Jun. 2000, pp. 1489-1506, XP008060077.
Search Report Dated Jun. 25, 2007.

* cited by examiner

*Primary Examiner* — Bhavesh Mehta
*Assistant Examiner* — Utpal Shah
(74) *Attorney, Agent, or Firm* — Tutunjian & Bitetto, P.C.

(57) ABSTRACT

The present invention provides a salience estimation method for object-based visual attention model. The method comprises steps of segmenting the image into a plurality of objects to be estimated, extracting feature maps for each segmented object, calculating the saliences of each segmented object in a set of circles defined around a center pixel of the object based on the extracted feature maps, and integrating the saliences of each segmented object in all circles in order to achieve an overall salience estimation for each segmented object. The present invention is much more human vision inosculated and of low computing complexity.

5 Claims, 4 Drawing Sheets

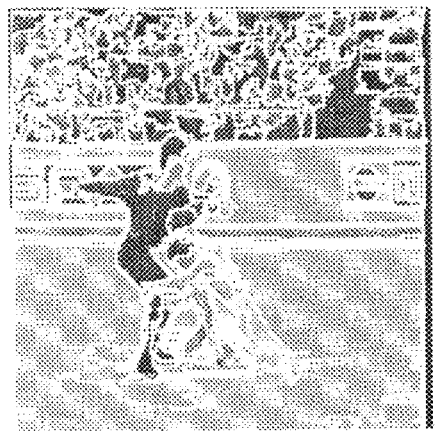 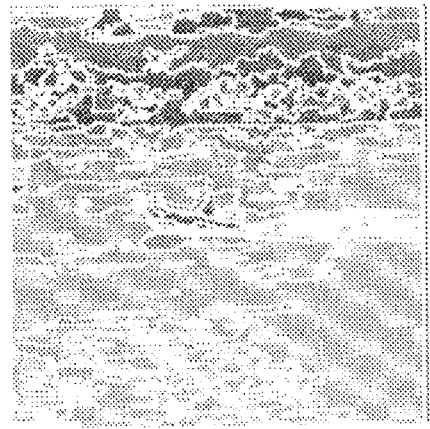
Fig.6a　　　　　　　　　　Fig.6b
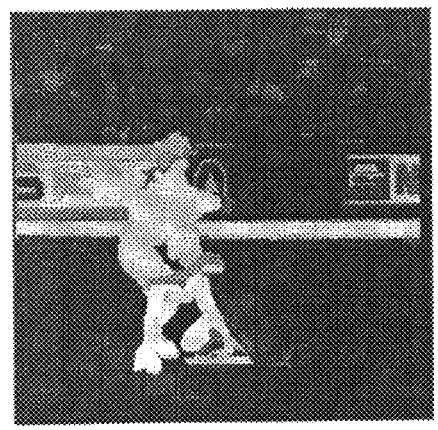 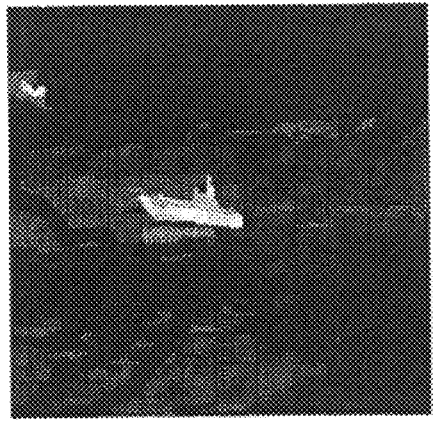
Fig.7a　　　　　　　　　　Fig.7b

SALIENCE ESTIMATION FOR OBJECT-BASED VISUAL ATTENTION MODEL

This application claims the benefit, under 35 U.S.C. §365 of International Application PCT/EP2007/054195, filed Apr. 27, 2007, which was published in accordance with PCT Article 21(2) on Nov. 8, 2007 in English and which claims the benefit of European patent application No. 06300418.8, filed Apr. 28, 2006 and European patent application No. 06300538.3, filed May 31, 2006.

FIELD OF THE INVENTION

The present invention relates to a method for estimating the salience of an image, and more particularly to a salience estimation method for object-based visual attention model.

BACKGROUND OF THE INVENTION

As a neurobiological conception, attention implies the concentration of mental powers upon an object by close or careful observation. Attention area is the area in a picture where tends to catch more human attention. The system designed to automatically detect the attention area of a picture is called attention model. The detected attention area is widely utilized in many kinds of applications, such as accumulating limited resource in an attention area, directing retrieval/search, simplifying analysis, etc.

FIG. 1 indicates the general architecture of a mostly used attention model. First, an image to be estimated is inputted into the attention model. Then the feature of intensity, colour, orientation, etc. will be achieved after the step of feature extraction. In the third step the salience of said features are estimated. After the steps of fusion scheme and post-processing the attention area is finally got.

Different from attention models used in most previous machine vision systems which drive attention based on the spatial location hypothesis with macro-block (MB) being the basic unit, other models which direct visual attention are object-driven, called object-based visual attention model.

A lot of researches on MB (macro-block) spatial-based visual attention are established as proposed by L. Itti et al., "A Model of Salience-Based Visual Attention for Rapid Scene Analysis", IEEE Transactions on Pattern Analysis and Machine Intelligence, Volume 20, No. 11, November 1998 and by Y. F. Ma et al., "A User Attention Model for Video Summarization", ACM Multimedia'02, pp. 533-542, December 2002. However, object-based visual attention is not so widely studied because of its inherent difficulty. Y. Sun et al. propose a framework of object-based visual attention in "Object-based Visual Attention for Computer Vision", Artificial Intelligence, pp. 77-123, May 2003. Another object-based visual attention model is presented by F. Orabona et al., "Object-based Visual Attention: a Model for a Behaving Robot", 3rd International Workshop on Attention and Performance in Computational Vision, June 2005. Both object-based visual attention schemes still follow the general architecture of attention model listed in FIG. 1. All the processes except "salience estimation" are directly inherited from Itti's MB spatial-based visual attention model.

No matter in MB spatial-based or in object-based visual attention models, low level spatial/temporal features are first extracted, and then for each salient (different, outstanding from its surroundings; or say, more attractive) feature map of each unit is estimated over the whole picture, after that a master "salience map" is generated by feeding all feature maps in a purely bottom-up manner.

Compared with object-based visual attention model, the MB spatial-based visual attention model is a much easier and faster creation. However, it has several inherent disadvantages:

1) The attention area breaks natural object boundary;
2) Each micro-block may cover lots of natural objects.

So, the extracted feature of the micro-block is a mixed property of all these natural objects and thus will lower down attention area detection precision.

The key issue of the object-based visual attention model lies in two aspects: one is the object grouping before feature extraction, the other is the particular efficient salience estimation of each object over all the objects in the image. The central idea of the currently used salience estimation scheme is based on Gauss distance measure as presented by Y. Sun et al.

Denote x as the object to be salience estimated, $y_i$ (i=1, 2, ..., n) as all the background objects, w as the maximum of the width and height of the input image, and $\|x-y_i\|$ as the physical distance between x and $y_i$, so the Gauss distance is defined as the formula (1), $$d_{gauss}(x, y_i) = \left(1 - \frac{\|x-y_i\|}{w-1}\right) e^{\frac{1}{2\sigma^2}\|x-y_i\|^2} \quad (1)$$

with the scale σ set to w/ρ, where ρ is a positive integer and generally 1/ρ may be set to a percentage of w such as 2%, 4%, 5% or 20%, 25%, 50%, etc.

Denote $S_F(x, y_i)$ as the absolute difference of object x and $y_i$ in feature F, then the salience estimation $S_F(X)$ as the overall salience degree of object x in feature F can be expressed as Formula (2).

$$S_F(x) = \frac{\sum_{i=1}^{n} S_F(x, y_i) \cdot d_{gauss}(x, y_i)}{\sum_{i=1}^{n} d_{gauss}(x, y_i)} \quad (2)$$

By the definition of the salience estimation, it can be concluded that:

1. The larger difference between the object and its surroundings exists, the more salient the object is.
2. The closer the object and its feature differed surroundings is, the more salient the object is. That is, human vision decreases its ability to distinguish the difference according to distance. The attenuation coefficient is measured by $d_{gauss}$, which is coherent with the visual physiology thesis.

This guarantees $S_F(x)$ is a useful salient estimation in feature F. Unfortunately, some important human perception properties are not considered in $S_F(x)$.

FIG. 2a is an original image of Skating to be estimated and FIG. 3a is the salience estimation result of FIG. 2a using the conventional object-based visual attention model.

FIG. 2b is an original image of Coastguard to be estimated and FIG. 3b is the salience estimation result of FIG. 2b using the conventional object-based visual attention model.

Both in FIG. 3a and FIG. 3b, white colour means a very outstanding object while black colour means not salient one, the grey level between white and black represents the salience degree.

From FIG. 3a we can see that the audience is considered salient, because its colour greatly differs from its neighbour's, but actually the part of audience contains no details. Viewers usually will not focus on the audience and recognize it as "video texture".

Also in FIG. 3a, there is a little grey block on the left of the female dancer's head. The block consists of a piece of white skating rink which is circled by black male clothing and female skin, and it is salient in this local area. But when all comes to all, this block is a part of the large skating rink and will not attract viewers' attention. This is called "Local effect". Because of the local effect, the accumulated difference between the object and its neighbours is large and thus it is recognized as "salience".

From forgoing description we can see that the conventional object-based visual attention model is not efficient enough and there are a lot of human vision properties not considered:

1. Object size—The estimation of the influence that the object size on salience degree is a complex problem. For example, (a) if all neighbouring objects $y_i$ are of the same size s and the size of object x decreases from s to 0, as a result the salience degree of x ($S_F(x)$) will decrease gradually, (b) if all neighbouring objects $y_f$ are of the same size s and the size of object x decreases from $s_1$ to $s_2$ ($s_1 >> s$, and $s_1 > s_2 > s$), $S_F(X)$ will increase gradually. Thus we know that the relationship between object size and salience degree is not monotonous. And the problem becomes even more complex when each of the objects may have an arbitrary size.

2. Local effect—If an object is not salient among its near neighbours (local area) while the far neighbours are greatly different from the object, there are two possible results: (a) the object is not salient at all inside the whole image; (b) the local area as a whole is salient inside the image with the object being a member of the local area. No matter in which case, the salient degree of the object does not match what defined above.

3. Video texture—Suppose the object features of an image are uniformly random, human will usually ignore the details of the whole image and not any object of the image is salient, while the above defined $S_F(x)$ will be a large number for any of the objects in the image.

With all these limitations, the conventional object-based visual attention model is far from applicable. Therefore an improved object-based visual attention model is desirable.

SUMMARY OF THE INVENTION

The present invention provides a salience estimation scheme for object-based visual attention model employing a multi-level concentric circled scheme capable of lowering the computing complexity and being more applicable.

In one aspect, the invention provides a method for estimating the salience of an image. It comprises steps of segmenting the image into a plurality of objects to be estimated; extracting feature maps for each segmented object; calculating the saliences of each segmented object in a set of circles defined around a centre pixel of the object based on the extracted feature maps; and integrating the saliences of each segmented object in the all circles in order to achieve an overall salience estimation for each segmented object. According to one preferred embodiment, the step of extracting feature maps is based on the measure of image colour variation. According to another preferred embodiment, the step of calculating the salience of each segmented object comprises a sub-step of comparing colour features of the object to be estimated with that of any other object in each circle defined around the object to be estimated.

Advantageously, the object-based visual attention model based on multi-level concentric circled salience estimation scheme of the present invention presents an efficient framework to construct object-based visual attention model, which is of low computing complexity and much more human vision inosculated.

Other characteristics and advantages of the invention will be apparent through the description of a non-limiting embodiment of the invention, which will be illustrated with the help of the accompanying drawings.

BRIEF DESCRIPTION OF DRAWINGS

FIG. 6a is an example of segmentation result of FIG. 2a according to the preferred embodiment of the present invention;

FIG. 6b is another example of segmentation result of FIG. 2b according to the preferred embodiment of the present invention;

FIG. 7a illustrates the estimated salience result of FIG. 2a using the salience estimation scheme according to the preferred embodiment of the present invention; and FIG. 7b illustrates the estimated salience result of FIG. 2b using the salience estimation scheme according to a preferred embodiment of the present invention.

DETAIL DESCRIPTION OF PREFERRED EMBODIMENTS

Figure 1:
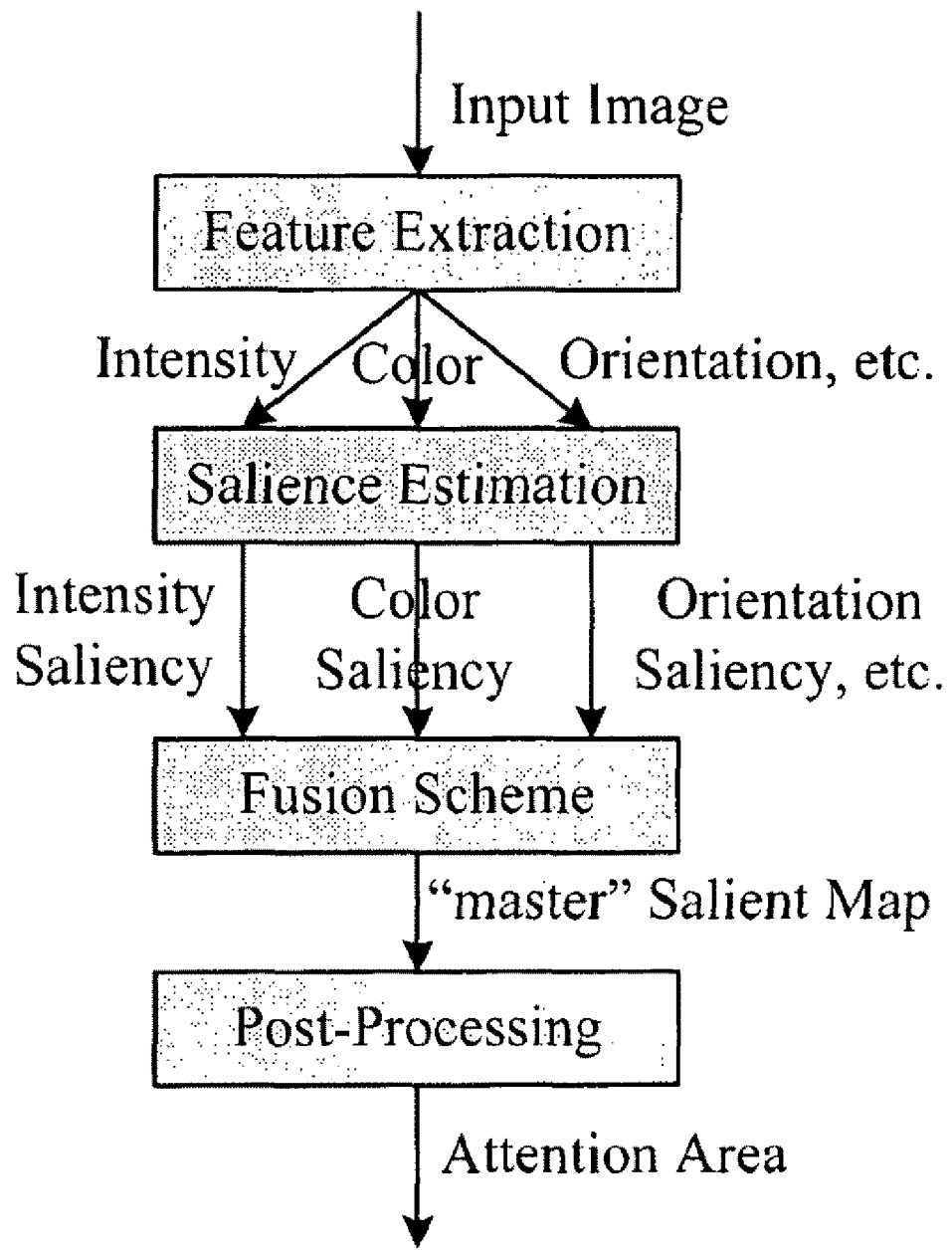
FIG. 1 illustrates a general architecture of a mostly used attention model.

The technical features of the present invention will be described further with reference to the embodiments. The embodiments are only preferable examples without limiting to the present invention. It will be well understood by the following detail description in conjunction with the accompanying drawings.

From the foregoing description we can see that the salience estimation process can be denoted as:

Input: An image I={$p_i$|i=1 ... w*h} with width w and height h;

Output: Salience map sal[1 ... w*h] with sal[i] the salient degree of pixel $p_i$ in the image.

The method of the present invention mainly includes three steps described as below:

Step 1—Pre-processing (image segmentation)

An image I is first decomposed into a set of objects I={$o_1$, $o_2$, ..., $o_n$} in this step. Image-based segmentation and grouping play a powerful role in human vision perception, a lot of researches have been developed in this area. In this invention we adopt the object segmentation scheme proposed by P. F. Felzenszwalb et al., "Image Segmentation Using Local Variation", IEEE Computer Society on Computer Vision and Pattern Recognition, June 1998, which is based on measures of image colour variation. Here gives a simple description of this scheme.

Before processing, an undirected graph H=(V, E) is defined based on the image I, where each pixel $p_i$ of I has a corresponding vertex $v_i \in V$, and an edge $(v_i, v_j) \in E$ connects vertices $v_i$ and $v_j$. The precise definition of which pixels are connected by edges in E depends on the expression (1-1).

$$E=\{(v_i,v_j) | \|p_i-p_j\| \leq d\} \quad (1-1)$$

For some given distance d., a weight function on the edges, weight(·), provides some non-negative measures of similarity (or difference) between the individual vertices $v_i$ and $v_j$. Define weight(·) as expression (1-2), $$\text{weight}((v_i, v_j)) = \begin{cases} |\text{Color}(v_i) - \text{Color}(v_j)| & (v_i, v_j) \in E \\ \infty & \text{otherwise} \end{cases} \quad (1-2)$$

where colour $(v_i)$ is the colour of pixel $p_i$ in the image.

$S=\{C_i\}$ denotes a segmentation of V and each $C_i$ corresponds to a segmented object. Define the internal variation of C as formula (1-3), $$\text{Int}(C) = \max_{e \in MST(C,E)} \text{weight}(e) \quad (1-3)$$

where MST(C, E) is a minimum spanning tree of C with respect to the set of E.

Define the external variation of two objects $C_1$ and $C_2$ as formula (1-4).

$$\text{Ext}(C_1, C_2) = \min_{v_i \in C_1, v_j \in C_2} \text{weight}((v_i, v_j)) \quad (1-4)$$

The process of the segmentation is to make the expression (1-5) satisfied for any two of the segmented objects:

$$\text{Ext}(C_1,C_2) \leq \min(\text{Int}(C_1)+k/|C_1|, \text{Int}(C_2)+k/|C_2|) \quad (1-5)$$

where k is a constant number set to 100 in our implementation. Denote Int(C)+k/|C| as the extended internal variation inside object C.

To achieve the segmented result, E is first sorted into $n=(e_1, e_2, \ldots, e_m)$ by non-decreasing edge weight and initially segment the image into w*h single pixel objects, then for each $e_q=(v_i,v_j)$ (q=1, 2, ..., m) repeat the next process: if $v_i$ and $v_j$ belong to different objects and weight $(v_i, v_j)$ is not larger than the extended internal variation(Int(C)+k/|C|) of the two objects they belong to, the two objects are merged to form a new single object.

It can be seen, this gives an efficient object segmentation scheme which will not cost too much of computing resource. In implementation, here uses an 8-connected neighbourhood for constructing E, that is d=1. FIG. 6a and FIG. 6b provide the segmentation results of FIG. 2a and FIG. 2b respectively.

Step 2—Pre-Processing (Feature Extraction)

With $y_i$, $r_i$, $g_i$, $b_i$ denoting the luminance, red, green and blue channels of pixel $p_i$, following we extract the features of each object segmented in step 1.

Considering the definition of extended internal variation Int(C)+k/|C|, wherein k/|C| is an addition to the internal variation because underestimating the internal variation is bad for preventing components from growing. As a result, small objects are more likely to grow regardless of the internal variation inside. For example, in the Skating example of FIG. 6a, the largest part of the black clothing mainly consists of black pixels but still there are some exceptions of white pixels.

To solve the feature extraction problem in the mentioned situation, an operator Major(f, o) is defined in the feature map $F=f(v_i)$ of an object $o=\{v_1, v_2, \ldots, v_t\}$. The returned value of Major (f, o) is the representative feature of the object o which is defined to satisfy ($d_1$, $d_2$ and $\eta$ are constant number, set to 2, 64 and 95% respectively in our implementation):

(1) If there exists a range [min, max] meeting the expression max-min+1$\leq d_1$ and the percentage of features whose values inside the range [min, max] over the whole feature map $F=(f(v_1), f(v_2), \ldots, f(v_t))$ are not smaller than $\eta$, Major(f, o) is then defined as the average value of those features whose values are inside the range [min, max].

(2) Otherwise, if an object size is larger than a constant $d_2$, the object is divided into two sub-objects by the same process as in step 1 and then loop above step for each sub-object; otherwise if the object is too small, just define Major(f, o) as the average value of all the features.

With operator Major (f, o), $Y_i$, $R_i$, $G_i$, $B_i$ and $\underline{Ye}_i$ being defined as the luminance, red, green, blue and yellow channels of object of (negative values are set to 0):

$$Y_i=\text{Major}(y,o_i)$$

$$R_i=\text{Major}(r,o_i)-(\text{Major}(g,o_i)+\text{Major}(b,o_i))/2$$

$$G_i=\text{Major}(g,o_i)-(\text{Major}(r,o_i)+\text{Major}(b,o_i))/2$$

$$B_i=\text{Major}(b,o_i)-(\text{Major}(r,o_i)+\text{Major}(g,o_i))/2$$

$$\underline{Ye}_i=(\text{Major}(r,o_i)+\text{Major}(g,o_i))/2-|\text{Major}(r,o_i)-\text{Major}(g,o_i)|/2-\text{Major}(b,o_i)$$

The intensity feature is extracted as formula (2-1).

$$I_i=Y_i \quad (2-1)$$

The "colour double-opponent" based colour features are extracted as formula (2-2) and (2-3).

$$RG_i=R_i-G_i \quad (2-2)$$

$$BY_i=B-\underline{Ye}_i \quad (2-3)$$

Orientation will be a certain complex feature in object based visual attention model. Since all the objects are segmented according to colour variations, the object itself then will not contain any orientation information except the border of the object. Because of this special property of the segmented objects, we will not consider orientation in the implementation.

Comparing with orientation, motion will be a more possible additional feature since currently optical flow techniques become more and more mature.

But for simplicity, we only consider the three feature maps $I_i$, $RG_i$ and $BY_i$ in present invention.

Step 3 Salience Estimation

After the above two steps the image I is segmented into objects $I=(o_1, o_2, \ldots, o_n)$ and three feature maps $I_i$, $RG_i$ and $BY_i$ (i=1 ... n) are extracted. The remaining problem is how to estimate the salience map for each feature map F (F $\subset$ {I, RG, BY}), denoted as $\text{Sal}_F(o_i)$.

For any object $o_i$ of the image, denote s, as the size (the number of pixels inside the object) and $c_i=(X_i, Y_i)$ as the centre pixel of the object. $X_i$ and $Y_i$ are described as formula (3-1).

$$X_i = \frac{1}{s_i}\sum_{j=1}^{s_i} x_j; \quad Y_i = \frac{1}{s_i}\sum_{j=1}^{s_i} y_j \qquad (3\text{-}1)$$

Figure 4:
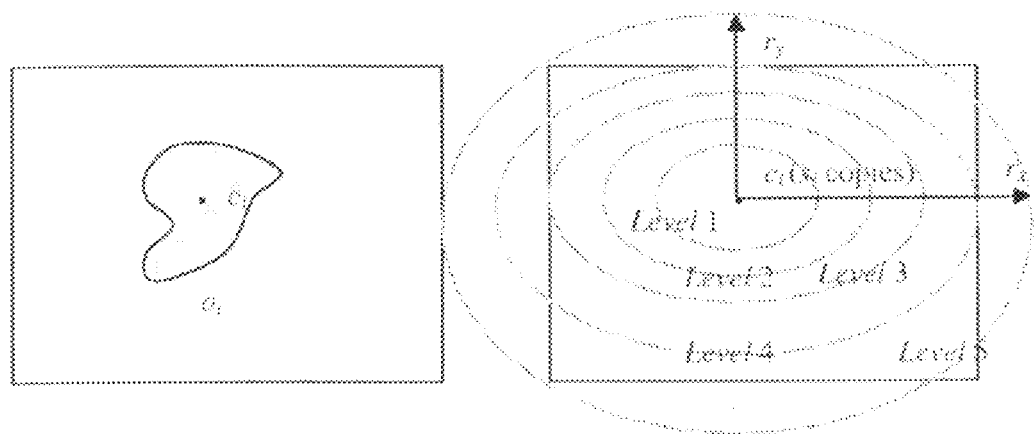
FIG. 4 illustrates the multi-level concentric circled scheme of the salience estimation according to a preferred embodiment of the present invention.

During the salience estimation process, each pixel of the $o_i$ is indistinctively considered equal to the center pixel $c_i$, so the object is considered duplicated $s_i$ copies of the center pixel as shown in FIG. 4.

Based on this assumption, there presents a multi-level concentric circled scheme for salience estimation of $o_i$. In the first step of this scheme, there defines a set of concentric circles circled around the center pixel $c_i$ of the object, $C_1 \ldots C_t$ ($C_j$ is an ellipse with horizontal radius $r_x$ and vertical radius $r_y$, and is called Level j circle) are distributed from the near neighbouring areas of the center pixel $c_i$ to the far neighbouring areas. For each level j circle, estimate the salience of $o_i$ inside $C_j$, denoted as $\mathrm{SalC}_F(o_i, C_j)$, and the overall estimated salience of $o_i$ is then defined as formula (3-2), where $k_t$ is a constant number for linear integration.

$$Sal_F(o_i) = \sum_{j=1}^{t} k_t \cdot SalC_F(o_i, C_j) \qquad (3\text{-}2)$$

Then, given an area $C_j$ and an object $o_i$ in $C_j$ with feature F extracted over $C_j$, how to estimate the salience of $o_i$ inside $C_j$ considering human vision properties? Here we first give the definition of the operation $\mathrm{SalC}_F$:

(1) Set S as the set of objects with center pixel inside $C_j$.

(2) For each object $o_u$ in S, define $F'_u = \mathrm{abs}(F_u - F_i)$. Then use the follow formula to calculate the weighted average of $F'_u$ in S.

$$avgF' = \frac{\sum_{\forall u, c_u \in S} F'_u \cdot S_u}{\sum_{\forall u, c_u \in S} S_u} \qquad (3\text{-}3)$$

(3) Define $\rho$ as the percentage of pixels in S with $F'_u$ not larger than avgF':

$$\rho = \frac{\sum_{\forall u, c_u \in S} bool(F'_u \le avgF') \cdot S_u}{\sum_{\forall u, c_u \in S} S_u} \qquad (3\text{-}4)$$

where bool(exp) returns 1 when exp is a true determinant else returns 0.

Figure 5:
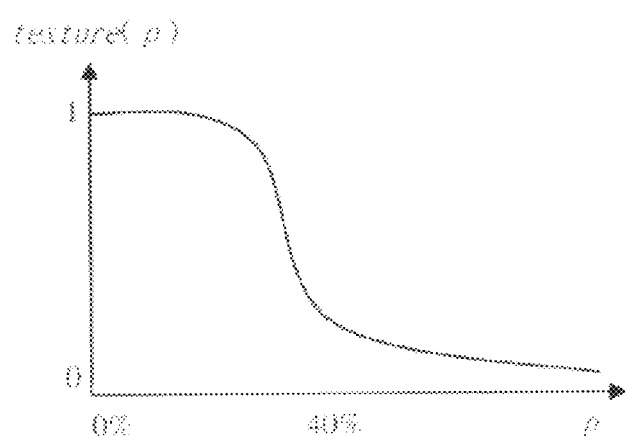
FIG. 5 illustrates an example definition of texture(·) in the invention.

(4) With the definition of a detection function texture (·) as shown in FIG. 5, $\mathrm{SalC}_F$ is set as below, $$SalC_F(o_i, C_j) = avgF' \times \mathrm{texture}(\rho) \qquad (3\text{-}5)$$

Where texture(·) is an empirical function of $\rho$ for detection of "audience area", i.e. the area with random featured objects such as audience, which is more expected not to be recognized as attention. The detection function texture ($\rho$) satisfies that the lower the value of $\rho$ is, the bigger the value of texture ($\rho$) will be, and thus the more chance this area is recognized as an "audience area" i.e. the video texture of the image. By using this detection function texture (·) there will be lower probability that the non-attention objects in the area are recognized as attention.

From the description above we can conclude the salience estimation scheme as below:

(a) For each object $o_i$ of the image, define a set of concentric circles $C_j$ (j=1 ... t).

(b) Calculate $\mathrm{SalC}_F(o_i, C_j)$ according to above definition of $\mathrm{SalC}_F$.

(c) Integrate the salience estimation for all $C_j$ according to expression (3-2) to get the overall estimated salience.

Figure 2A:
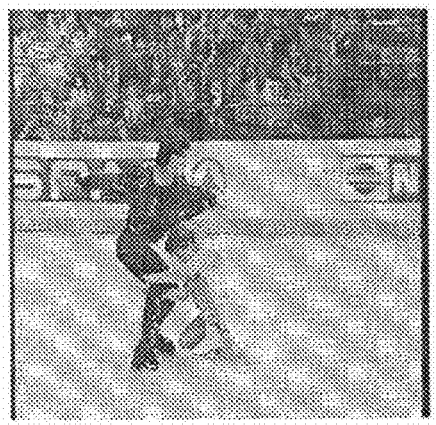
FIG. 2a illustrates an original image of Skating to be salience estimated.
Figure 2B:
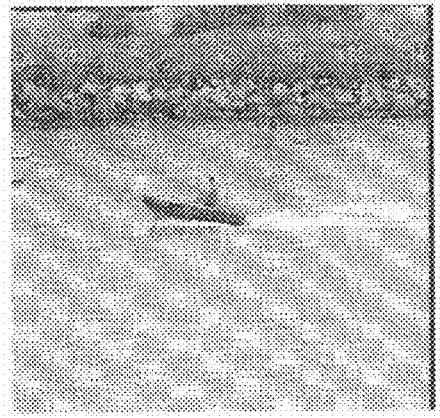
FIG. 2b illustrates an original image of Coastguard to be salience estimated.
Figure 3A:
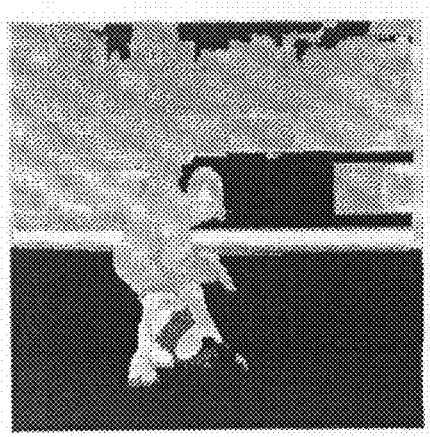
FIG. 3a is the salience estimation result of FIG. 2a using the conventional object-based visual attention model.
Figure 3B:
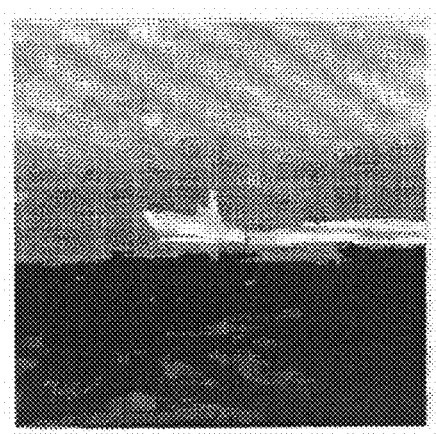
FIG. 3b is the salience estimation result of FIG. 2b using the conventional object-based visual attention model.

FIG. 7a and FIG. 7b respectively present the salience estimation experimental results of FIG. 2a and FIG. 2b by using the salience estimation scheme according to the present invention. By using the present salience estimation method, the audience in FIG. 2a and the background in FIG. 2b are considered not salient, and the little block on the left of the female dancer's head in FIG. 3a is also removed from FIG. 7a. The present invention is capable of handing the local effect and video texture and it is more applicable.

Whilst there has been described in the forgoing description preferred embodiments and aspects of the present invention, it will be understood by those skilled in the art that many variations in details of design or construction may be made without departing from the present invention. The present invention extends to all features disclosed both individually, and in all possible permutations and combinations.

The present object-based visual attention model based on multi-level concentric circled salience estimation scheme gives a more accuracy on understanding of the image and a far more computing efficiency, it has several advantages as below:

1. The invention presents an efficient framework to construct object-based visual attention model. It is of low computing complexity.

2. The presented framework is much more human vision inosculated. The un-considered human vision properties in conventional schemes (such as object size, local effect and video texture) are well issued.

3. The framework is extendable.

The invention claimed is:

1. A method for detecting an object in a digital picture, comprising the steps of:
   segmenting the image into a plurality of separate objects;
   for an object,
   extracting a feature value for the object as a function of pixels of the object, the feature value comprising at least one of luminance intensity and color, wherein when extracting the feature value of an object, if the number of plurality of pixels in the object whose feature values fall into a range exceeds a predetermined threshold compared with the total number of pixels in the object, the average of the feature values of the plurality of pixels is extracted as the feature value of the object;
   selecting the object's neighboring area said neighboring area being circular around the object:
   weighting an average difference between the feature value of the object and the feature value of each of other objects in the neighboring area by using a size of each of other objects to obtain a weighted average feature difference of the object; and
   selecting an object from the plurality of objects according to their weighted average feature difference as the detected object.

2. The method according to claim 1, wherein for the object, multiple neighboring areas can be selected in said step of selecting the object's neighboring area, and said step of weighting the average difference between the feature value of the object and the feature value of each of other objects in the neighboring area is performed in each neighboring area to get a total weighted average feature difference by linearly summing up all the weighted average feature difference of the object in each neighboring area.

3. The method according to claim 2, wherein if there are multiple neighboring areas, these multiple neighboring areas are concentrically circular.

4. The method according to claim 3, wherein the neighboring area of the object is centered by a center pixel of the object.

5. The method according to claim 1, wherein the size of each of other objects is the number of pixels therein.

* * * * *